United States Patent [19]
Shimasaki et al.

[11] Patent Number: 6,019,183
[45] Date of Patent: Feb. 1, 2000

[54] HYBRID VEHICLE

[75] Inventors: Yuichi Shimasaki; Kenji Nakano; Hironao Fukuchi; Hideyuki Takahashi; Kazutomo Sawamura; Teruo Wakashiro, all of Wako, Japan

[73] Assignee: Honda Giken Kogyo Kabushiki Kaisha, Tokyo, Japan

[21] Appl. No.: 09/193,255

[22] Filed: Nov. 17, 1998

[30] Foreign Application Priority Data

Nov. 18, 1997 [JP] Japan ..................... 9-316744

[51] Int. Cl.$^7$ ..................................... B60K 1/00
[52] U.S. Cl. .................... 180/165; 180/65.2; 180/65.3; 180/65.4
[58] Field of Search .................... 180/165, 65.1, 180/65.2, 65.3, 65.4, 65.6, 65.7, 65.8; 318/101, 139, 140; 477/2, 3, 6

[56] References Cited

U.S. PATENT DOCUMENTS

| | | | |
|---|---|---|---|
| 5,806,617 | 9/1998 | Yamaguchi | 180/65.3 |
| 5,931,249 | 8/1999 | Ellis et al. | 180/65.3 |
| 5,934,396 | 8/1999 | Karita | 180/65.3 |

FOREIGN PATENT DOCUMENTS 5-38956   2/1993   Japan.
8-317506  11/1996  Japan.

*Primary Examiner*—Richard M. Camby
*Attorney, Agent, or Firm*—Armstrong, Westerman, Hattori, McLelland & Naughton

[57] ABSTRACT

A hybrid vehicle has an engine for propelling the hybrid vehicle, a power transfer mechanism for transferring an output power of the engine from an output shaft thereof to drive wheels of the hybrid vehicle, an electric motor for supplying an assistive output power to assist the output power of the engine through the power transfer mechanism to the drive wheels, and an electric energy storage unit for storing electric energy for energizing the electric motor. The hybrid vehicle also has a controller for controlling operation of the hybrid vehicle with the engine and the electric motor. If the amount of electric energy stored in the electric energy storage unit is greater than a predetermined quantity, the controller controls the electric motor to generate the assistive output power to start the hybrid vehicle with the electric energy supplied from the electric energy storage unit to the electric motor while the engine is idling or stopped. If the amount of electric energy stored in the electric energy storage unit is smaller than the predetermined quantity, the controller controls the engine to generate an output power to start the hybrid vehicle while the electric motor is being de-energized.

7 Claims, 6 Drawing Sheets

HYBRID VEHICLE

BACKGROUND OF THE INVENTION

1. Field of the Invention

The present invention relates to a hybrid vehicle, and more particularly to a parallel hybrid vehicle.

2. Description of the Related Art

Generally known parallel hybrid vehicles have an internal combustion engine as a primary propulsive power unit and an electric motor for generating an assistive output power for assisting the output power produced by the engine. The output powers (mechanical powers) generated by the engine and the electric motor are transmitted through a transmission to drive wheels of the hybrid vehicle.

For accelerating the hybrid vehicle, the electric motor is controlled to generate an assistive output power, and both the output power produced by the engine and the assistive output power from the electric motor are transmitted to the drive wheels. Therefore, the power requirements for accelerating the hybrid vehicle can be met, and the output power produced by the engine may be relatively small, thus reducing fuel consumption by the engine and exhaust gases emitted from the engine.

While the hybrid vehicle is decelerating, the electric motor is operated as an electric generator to regenerate electric energy by the kinetic energy of the hybrid vehicle which is transmitted from the drive wheels through the transmission to the electric motor. The regenerated electric energy is stored in an electric energy storage unit such as a battery used as a power supply for the electric motor.

The hybrid vehicle may be started by only the output power from the electric motor as disclosed in Japanese laid-open patent publication No. 5-38956, for example, or by the output power from both the engine and the electric motor while the engine is operating in a highest-efficiency torque range as disclosed in Japanese laid-open patent publication No. 8-317506, for example.

The output power applied to the drive wheels needs to be relatively large for smoothly starting the hybrid vehicle. Therefore, when the hybrid vehicle is started by only the output power from the electric motor, if the amount of electric energy stored in the electric energy storage unit for energizing the electric motor is relatively small, then the electric motor fails to generate a sufficient output power. As a result, the hybrid vehicle may not be started smoothly, or the electric energy stored in the electric energy storage unit may be rapidly consumed, resulting in an undue deterioration of the electric energy storage unit.

When the hybrid vehicle is started by the output power from both the engine and the electric motor while the engine is operating in a highest-efficiency torque range, inasmuch as the output power from the engine while operating in the highest-efficiency torque range is generally small, the hybrid vehicle has to rely highly upon the output power from the electric motor in order to be started smoothly. As a consequence, if the amount of electric energy stored in the electric energy storage unit for energizing the electric motor is relatively small, then the electric motor also fails to generate a sufficient output power. Thus, the hybrid vehicle may not be started smoothly, or the electric energy stored in the electric energy storage unit may be rapidly consumed, resulting in an undue deterioration of the electric energy storage unit.

The above drawbacks may be overcome by starting the hybrid vehicle with only the output power from the engine at all times. However, using only the output power from the engine to start the hybrid vehicle substantially increases the amount of fuel consumed by the engine.

SUMMARY OF THE INVENTION

It is therefore an object of the present invention to provide a hybrid vehicle which can be started smoothly while preventing an electric energy storage unit from being unduly deteriorated by excessive consumption of electric energy stored therein for energizing an electric motor and also reducing the amount of fuel consumed by an engine.

According to the present invention, the above object can be accomplished by a hybrid vehicle comprising an engine for propelling the hybrid vehicle, the engine having an output shaft, power transfer means for transferring an output power of the engine from the output shaft thereof to drive wheels of the hybrid vehicle, an electric motor for supplying an assistive output power to assist the output power of the engine through the power transfer means to the drive wheels, electric energy storage means for storing electric energy for energizing the electric motor, and vehicle operation control means for controlling operation of the hybrid vehicle with the engine and the electric motor, the vehicle operation control means comprising means for controlling the electric motor to generate the assistive output power to start the hybrid vehicle with the electric energy supplied from the electric energy storage means to the electric motor while the engine is idling or stopped, if the amount of electric energy stored in the electric energy storage means is greater than a predeter- mined quantity, and for controlling the engine to cause the output shaft to generate an output power to start the hybrid vehicle while the electric motor is being de-energized, if the amount of electric energy stored in the electric energy storage means is smaller than the predetermined quantity.

For starting the hybrid vehicle, if the amount of electric energy stored in the electric energy storage means is greater than the predetermined quantity and hence is sufficient enough, then the hybrid vehicle is started with the assistive output power of the electric motor. At this time, since the electric energy storage means stores a sufficient amount of electric energy for energizing the electric motor, the electric motor is capable of generating an output power necessary to start the hybrid vehicle smoothly, and the electric energy storage means is substantially free of undue deterioration. Because the engine is idling or stopped, i.e., the engine produces no output power, the amount of fuel consumed by the engine is very small, or the engine consumes no fuel.

When the hybrid vehicle is to be started, if the amount of electric energy stored in the electric energy storage means is smaller than the predetermined quantity and hence is not sufficient enough, then the hybrid vehicle is started with the output power of the engine. Since the electric motor is de-energized at this time, i.e., since no electric energy is supplied to the electric motor, the electric motor does not consume the electric energy stored in the electric energy storage means, which is prevented from being unduly deteriorated. Inasmuch as the hybrid vehicle is started with the output power of the engine, the hybrid vehicle is smoothly started as with ordinary automobiles.

Consequently, when the hybrid vehicle is started, it maintains a desired level of starting performance, and the electric energy storage means which stores electric energy for energizing the electric motor is prevented from being unduly deteriorated due to consumption of excessive electric energy. In addition, the consumption of fuel by the engine is reduced.

Preferably, the hybrid vehicle further comprises engine clutch means controllable by the vehicle operation control means, for connecting the output shaft of the engine disconnectably to the power transfer means, the electric motor being connected to the power transfer means at an output side of the engine clutch means, the vehicle operation control means comprising means for disengaging the engine clutch means when the hybrid vehicle is started by the assistive output power generated by the electric motor.

Therefore, for staring the hybrid vehicle with the assistive output power generated by the electric motor, the engine clutch means is disengaged, and hence the assistive output power generated by the electric motor is not transferred to the output shaft of the engine, but is transferred only to the drive wheels through the power transfer means. Thus, the assistive output power of the electric motor is not wasted by the engine as a load, but is efficiently transferred to the drive wheels for starting the hybrid vehicle. The assistive output power generated by the electric motor can be made as small as possible, and the hybrid vehicle can smoothly be started while suppressing the consumption of electric energy from the electric energy storage means.

The vehicle operation control means comprises means for controlling the engine to cause the output shaft to generate an output power to start the hybrid vehicle while the electric motor is being de-energized, if the speed of the hybrid vehicle is higher than a predetermined speed after the hybrid vehicle is started by the assistive output power generated by the electric motor.

In the case where the hybrid vehicle has the engine clutch means, the vehicle operation control means comprises means for disengaging the engine clutch means and controlling the engine to cause the output shaft to generate an output power to start the hybrid vehicle while the electric motor is being de-energized, if the speed of the hybrid vehicle is higher than a predetermined speed after the hybrid vehicle is started by the assistive output power generated by the electric motor.

Consequently, after the hybrid vehicle has been started with the assistive output power generated by the electric motor, when the speed of the hybrid vehicle increases to or beyond the predetermined speed and the hybrid vehicle does not require a large drive power for propulsion, the electric motor is de-energized, and the hybrid vehicle is propelled by the output power of the engine. The hybrid vehicle can thus be continuously propelled while minimizing the consumption of fuel by the engine, and any unwanted consumption of electric energy from the electric energy storage means is suppressed. If the engine clutch means is disengaged when the hybrid vehicle is started with the assistive output power of the electric motor, then when the speed of the hybrid vehicle increases to or beyond the predetermined speed, the engine clutch means is engaged, and the hybrid vehicle can be propelled with the output power of the engine.

In the case where the hybrid vehicle is propelled with the output power of the engine when the speed of the hybrid vehicle increases to or beyond the predetermined speed after the hybrid vehicle is started with the assistive output power of the electric motor, the hybrid vehicle further comprises motor clutch means controllable by the vehicle operation control means, for connecting the electric motor disconnectably to the power transfer means, the vehicle operation control means comprising means for engaging the motor clutch means for starting the hybrid vehicle with the assistive output power generated by the electric motor, and for disengaging the motor clutch means for propelling the hybrid vehicle with the output power of the engine after the hybrid vehicle is started.

Therefore, after the hybrid vehicle has been started with the assistive output power generated by the electric motor, when the hybrid vehicle is propelled by the output power of the engine at the time the speed of the hybrid vehicle increases to or beyond the predetermined speed, the motor clutch means is disengaged, cutting off the transmission of the power between the output shaft of the engine, the power transfer means, and the electric motor. The rotor of the electric motor is thus not rotated by the output power of the engine, reducing the load on the engine. Accordingly, the consumption of fuel by the engine is reduced.

With the hybrid vehicle having the motor clutch means, the vehicle operation control means preferably comprises means for disengaging the motor clutch means after the hybrid vehicle is started with the output power of the engine.

Preferably, the hybrid vehicle further comprises motor clutch means controllable by the vehicle operation control means, for connecting the electric motor disconnectably to the power transfer means, the vehicle operation control means comprising means for disengaging the motor clutch means when the hybrid vehicle is started with the output power of the engine.

When the hybrid vehicle is started with the output power of the engine, the motor clutch means is thus disengaged, cutting off the transmission of the power between the output shaft of the engine, the power transfer means, and the electric motor. The rotor of the electric motor is thus not rotated by the output power of the engine, reducing the load on the engine. Accordingly, the consumption of fuel by the engine is reduced.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
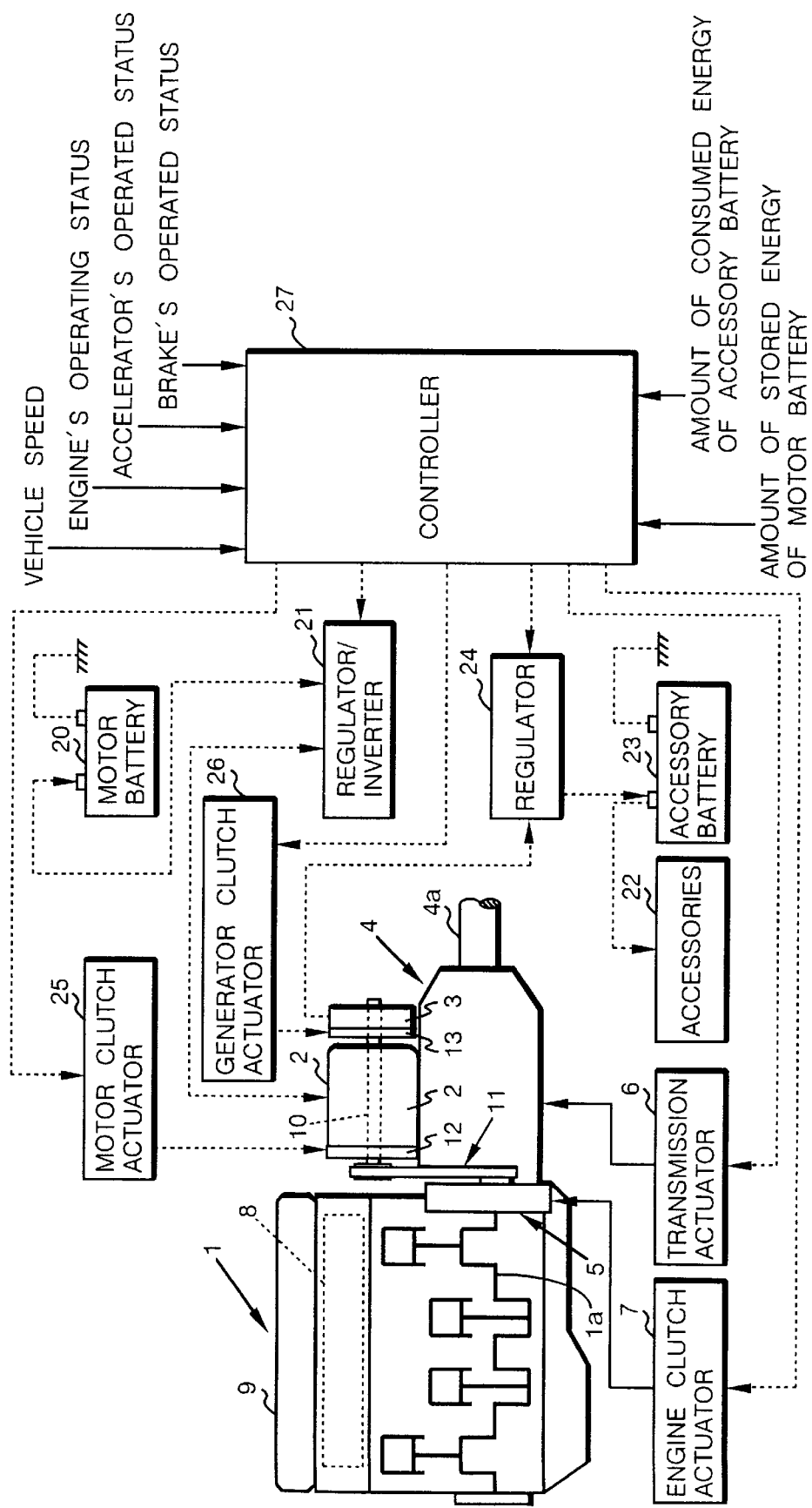
FIG. 1 is a block diagram of a system arrangement of a hybrid vehicle according to the present invention.

As shown in FIG. 1, a hybrid vehicle according to the present invention has an internal combustion engine 1, an electric motor 2 (more specifically, a generator motor that can operate also as an electric generator, an electric generator 3, and a transmission 4. The engine 1 has a crankshaft 1*a* as an output shaft coupled through a clutch mechanism 5 (hereinafter referred to as an "engine clutch 5") disconnectably to an input shaft of the transmission 4 whose output drive shaft 4*a* is operatively connected to drive wheels of the hybrid vehicle through a differential gear mechanism (not shown).

The transmission 4 is operated to change its gear position by a transmission actuator 6 which comprises a hydraulic pump and a hydraulic circuit (not shown). Similarly, the engine clutch 5 is operated for engagement and disengagement by a hydraulic engine clutch actuator 7. The engine 1 is supplied with fuel from a fuel supply unit 8, and the fuel supplied to the engine 1 ignited by an ignition unit 9.

The electric motor 2 and the electric generator 3 comprise a magnet electric motor and a magnet electric generator, respectively, and disposed coaxially with each other in a space above the transmission 4 and mounted on the transmission 4. A transfer shaft 10 extends coaxially through and interconnects the electric motor 2 and the electric generator 3. The transfer shaft 10 is operatively connected to the input shaft of the transmission 4, i.e., the output shaft of the engine clutch 5, by a power transfer mechanism 11 such as a pulley and belt mechanism, for rib example, so that the transfer shaft 10 can rotate in synchronism with the input shaft of the transmission 4 and the output shaft of the engine clutch 5. The electric motor 2 and the electric generator 3 have respective rotatable shafts disconnectably coupled to the transfer shaft 10 respectively by an electromagnetic clutch 12 (motor clutch means) and an electromagnetic clutch 13 (generator clutch means).

Figure 2:
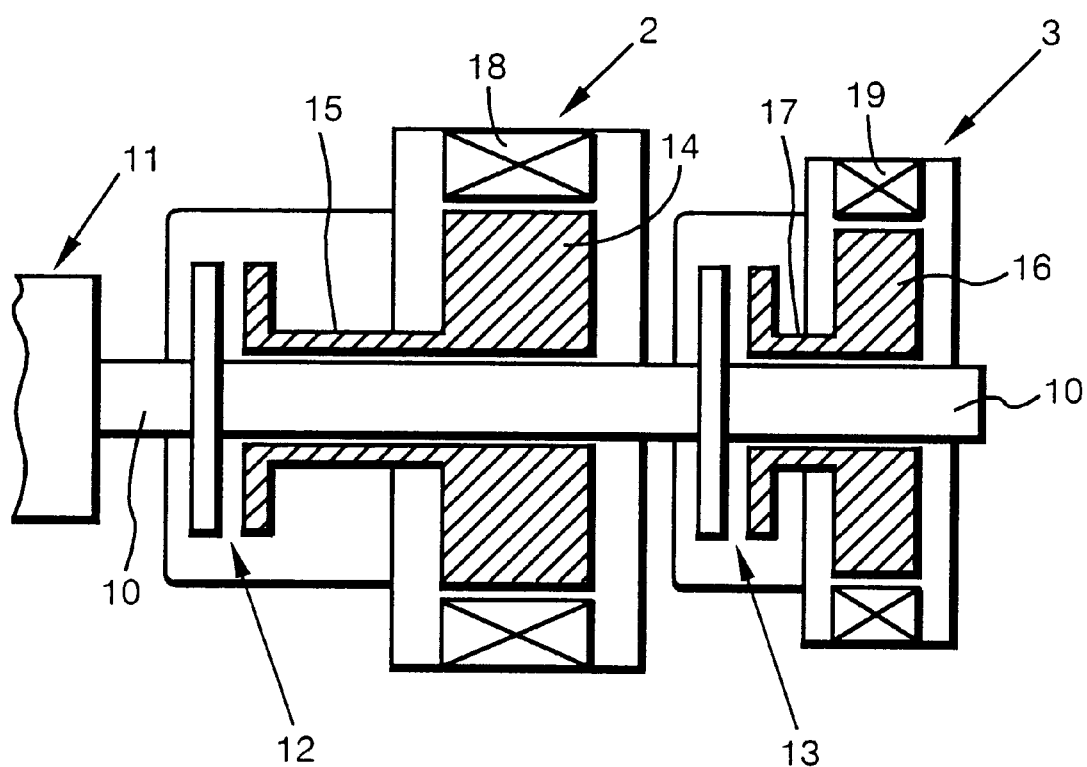
FIG. 2 is a schematic cross-sectional view of an electric motor and an electric generator on the hybrid vehicle shown in FIG. 1.

Specifically, as shown in FIG. 2, the electric motor 2 comprises a rotor 14 composed of magnets and a hollow rotatable shaft 15 extending coaxially from the rotor 14. The rotor 14 and the rotatable shaft 15 are rotatably supported on the transfer shaft 10 by bearings (not shown). The rotatable shaft 15 has an end disconnectably coupled to the transfer shaft 10 by the electromagnetic clutch 12 interposed between the rotatable shaft 15 and the transfer shaft 10.

Likewise, the electric generator 3 comprises a rotor 16 composed of magnets and a hollow rotatable shaft 17 extending coaxially from the rotor 16. The rotor 16 and the rotatable shaft 17 are rotatably supported on the transfer shaft 10 by bearings (not shown). The rotatable shaft 17 has an end disconnectably coupled to the transfer shaft 10 by the electromagnetic clutch 13 interposed between the rotatable shaft 17 and the transfer shaft 10.

Therefore, when the electromagnetic clutches 12, 13 (hereinafter referred to as an "electric motor clutch 12" and an electric generator clutch 13", respectively) are engaged, the rotatable shafts 15, 17 rotate in unison with the transfer shaft 10, and hence in synchronism with the input shaft of the transmission 4 and the output shaft of the engine clutch 5.

As shown in FIG. 2, the electric motor 2 and the electric generator 3 have respective stator coils 18, 19 disposed respectively around the rotors 14, 16.

When the engine 1 operates to cause the crankshaft 1a to generate an output power for propelling the hybrid vehicle while the engine clutch 5 is being engaged, the generated output power is transferred through the transmission 4 to the drive wheels, thereby propelling the hybrid vehicle. When the stator coil 18 of the electric motor 2 is energized to cause the rotatable shaft 15 to generate an assistive output power (mechanical drive power) to assist the output power of the engine 1 while the electric motor clutch 12 is being engaged, the assistive output power is added to the output power from the engine 1 through the transfer shaft 10 and the power transfer mechanism 11. The sum of the assistive output power and the output power from the engine 1 is then transferred through the transmission 4 to the drive wheels. When the electric generator clutch 13 is engaged while the engine clutch 5 is being engaged, the output power of the engine 1 is transferred through the power transfer mechanism 11 and the transfer shaft 10 to the rotatable shaft 17 of the electric generator 3, thus actuating the electric generator 3 to cause the stator coil 19 to induce electric energy.

When the electric motor clutch 12 is engaged while the hybrid vehicle is decelerating, the kinetic energy of the hybrid vehicle is transferred from the drive wheels through the transmission 4, the power transfer mechanism 11, and the transfer shaft 10 to the rotatable shaft 15 of the electric motor 2, which then operates as an electric generator. At this time, the stator coil 18 of the electric motor 2 induces regenerated electric energy. Similarly, when the electric generator clutch 13 is engaged while the hybrid vehicle is decelerating, the kinetic energy of the hybrid vehicle is transferred to the rotatable shaft 17 of the electric generator 3, which then is actuated to generate electric energy.

The hybrid vehicle has, in addition to its mechanism arrangement described above, an electric arrangement described below.

As shown in FIG. 1, the hybrid vehicle includes an electric motor battery 20 (electric motor energy storage means) for storing electric energy as a power supply for the electric motor 2, a regulator/inverter 21 for transmitting electric energy between the electric motor battery 20 and the electric motor 2, an accessory battery 23 (accessory energy storage means) for storing electric energy as a power supply for various accessories 22 including an air-conditioning system (not shown) and an audio system (not shown) on the hybrid vehicle, a regulator 24 for supplying electric energy generated by the electric generator 3 to the accessory battery 23, an electric motor clutch actuator 25 for actuating the electric motor clutch 12, an electric generator clutch actuator 26 for actuating the electric generator clutch 13, and a controller 27 comprising a microcomputer.

The electric motor battery 20 has a high output voltage of about one hundred and several tens V, and the accessory battery 23 has a low output voltage of 12 V. The electric energy stored in the accessory battery 23 is also used as a power supply for electronic devices (which are also accessories) including the controller 27 and the ignition unit 9) as well as the air-conditioning system and the audio system.

The controller 27 serves as vehicle operation control means for controlling operation of the hybrid vehicle including the engine 1, the electric motor 2, and the electric generator 3. The controller 15 is supplied with various data indicative of operating statuses of the engine 1, including a rotational speed and an intake air pressure, data indicative of operated statuses of accelerator and brake pedals pressed by the driver of the hybrid vehicle, and data indicative of a speed of the hybrid vehicle, from corresponding sensors (not shown). The controller 27 is also supplied with data indicative of an amount of electric energy (remaining capacity) stored in the electric motor battery 20 from appropriate sensors (e.g., a voltage sensor, a current sensor, and a temperature sensor) associated with the electric motor battery 20, and with data indicative of an amount of electric energy consumed from the accessory battery 23 (an amount of electric energy supplied from the accessory battery 23 to the accessories 22) from appropriate sensors (e.g., a voltage sensor and a current sensor) associated with the accessory battery 23.

The controller 27 controls operation of the engine 1 and the other devices based on the various data supplied thereto. Specifically, the controller 27 has major functions to control the engine 1 through the fuel supply unit 8 and the ignition unit 9, to engage and disengage the engine clutch 5 through the engine clutch actuator 7, to control the transmission 4 through the transmission actuator 6, to control the electric motor 2 through the regulator/inverter 21, to control the electric generator 3 through the regulator 24, to engage and disengage the electric motor clutch 12 through the electric motor clutch actuator 25, and to engage and disengage the electric generator clutch 13 through the electric generator clutch actuator 26.

Operation of the hybrid vehicle, particularly a processing operation of the controller 27, will be described below with reference to FIGS. 3 through 6.

Figure 3:
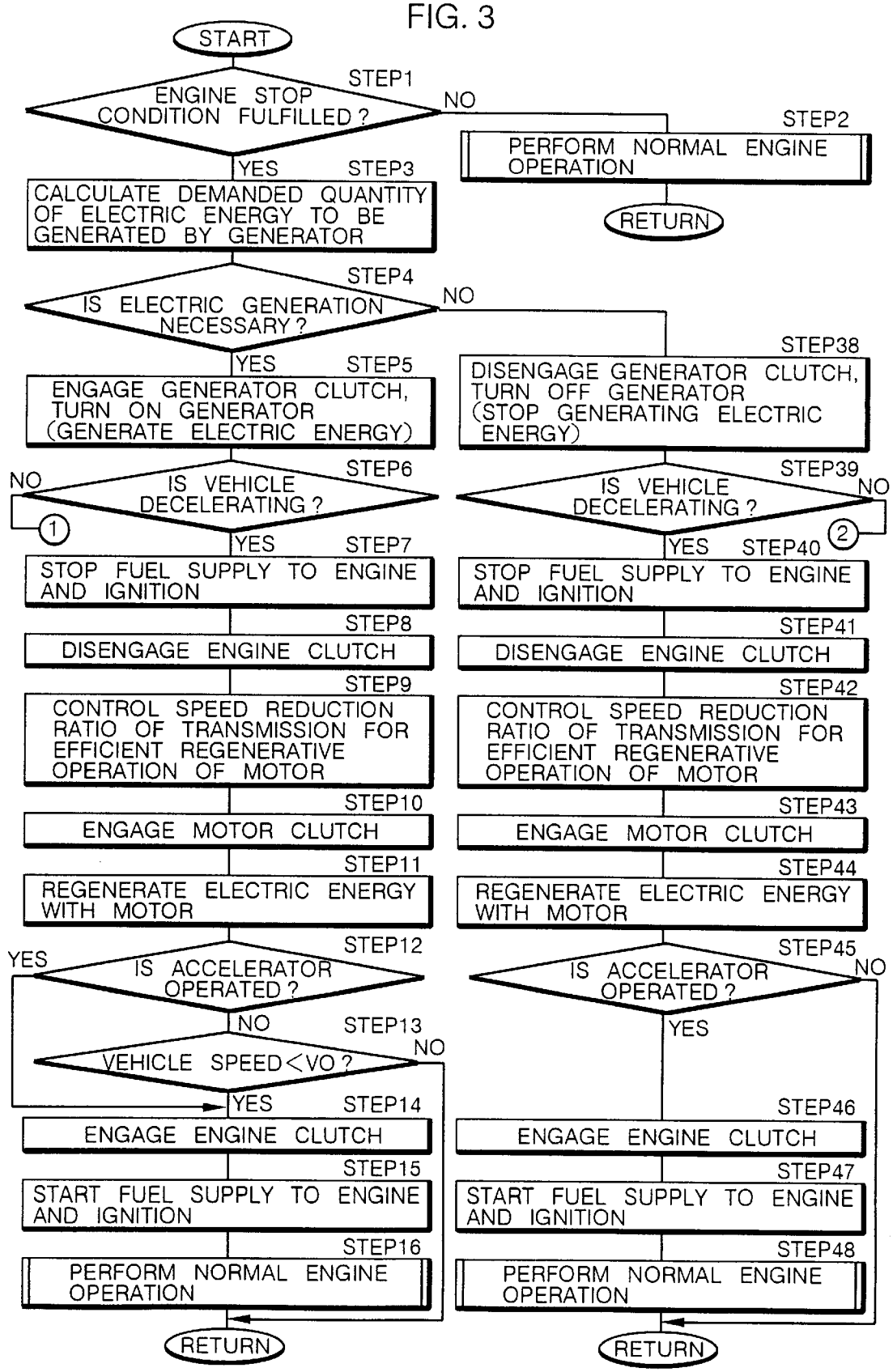
FIGS. 3 through 6 are a flowchart of an operation sequence of the hybrid vehicle shown in FIG. 1.

As shown in FIG. 3, the controller 27 decides whether the present operating status of the engine 1 fulfills a condition to be able to carry out a process of stopping operation of the engine 1 (a process of stopping fuel supply and ignition of the engine 1), which will be described later on, in STEP1. The controller 27 makes such a decision based on the coolant temperature and intake air temperature of the engine 1. If the coolant temperature of the engine 1 is lower than a predetermined value or the intake air temperature of the engine 1 is higher than a predetermined value, then it will be difficult to restart the engine 1 once the engine 1 is stopped. In this case, therefore, the controller 27 determines that the condition to be able to carry out the process of stopping operation of the engine 1 is not fulfilled. Conversely, if the coolant temperature of the engine 1 is higher than the predetermined value or the intake air temperature of the engine 1 is lower than the predetermined value, the controller 27 determines that the condition to be able to carry out the process of stopping operation of the engine 1 is fulfilled.

If the controller 27 determines that the condition to be able to carry out the process of stopping operation of the engine 1 is not fulfilled, then the controller 27 performs a normal engine operation in STEP2, and then repeats STEP1. In the normal engine operation, the controller 27 controls the engine 1 through the fuel supply unit 8 and the ignition unit 9 to generate an output power depending on the operated status of the accelerator pedal, and also controls the transmission 4 through the transmission actuator 6 depending on the operated status of the accelerator pedal and the speed of the hybrid vehicle. Furthermore, the controller 27 engages the engine clutch 5 with the engine clutch actuator 7 to transmit the output power from the engine 1 through the transmission 4 to the drive wheels of the hybrid vehicle, thereby propelling the hybrid vehicle. Therefore, the hybrid vehicle is propelled in the same manner as with ordinary automobiles in the normal engine operation.

If the controller 27 determines that the condition to be able to carry out the process of stopping operation of the engine 1 is fulfilled in STEP1, then the controller 27 calculates a demanded quantity of electric energy to be generated by the electric generator 3 in STEP3. The demanded quantity of electric energy is determined depending on the amount of electric energy consumed from the accessory battery 23 by the accessories 22, i.e., the amount of electric energy supplied from the accessory battery 23 to the accessories 22. The greater the amount of electric energy consumed from the accessory battery 23 by the accessories 22, the larger the demanded quantity of electric energy to be generated by the electric generator 3.

Thereafter, the controller 27 decides whether electric generation by the electric generator 3 is necessary or not based on the amount of electric energy consumed from the accessory battery 23 or the corresponding demanded quantity of electric energy in STEP4. If the amount of electric energy consumed from the accessory battery 23 or the corresponding demanded quantity of electric energy is smaller than a predetermined value, then the controller 27 determines that electric generation by the electric generator 3 is not necessary. Conversely, if the amount of electric energy consumed from the accessory battery 23 or the corresponding demanded quantity of electric energy is greater than the predetermined value, then the controller 27 determines that electric generation by the electric generator 3 is necessary.

In this embodiment, the controller 27 decides whether electric generation by the electric generator 3 is necessary or not based on the amount of electric energy consumed from the accessory battery 23 or the corresponding demanded quantity of electric energy, as described above. However, the controller 27 may instead decide whether electric generation by the electric generator 3 is necessary or not based on the amount of electric energy (remaining capacity) stored in the accessory battery 23. For example, the controller 27 may determine that electric generation by the electric generator 3 is not necessary if the remaining capacity of the accessory battery 23 is greater than a predetermined value (e.g., 80%) and hence is close to a fully charged state, and that electric generation by the electric generator 3 is necessary if the remaining capacity of the accessory battery 23 is smaller than the predetermined value. At this time, the controller 27 may determine a demanded quantity of electric energy to be generated by the electric generator 3, depending on the remaining capacity (the stored amount of electric energy) of the accessory battery 23. For example, the controller 27 may increase a demanded quantity of electric energy as the remaining capacity of the accessory battery 23 is smaller.

Alternatively, the controller 27 may decide whether electric generation by the electric generator 3 is necessary or not depending on both the consumed amount of electric energy and the stored amount of electric energy of the accessory battery 23. For example, the controller 27 may determine that electric generation by the electric generator 3 is necessary if the consumed amount of electric energy of the accessory battery 23 is greater than a predetermined value and the stored amount of electric energy of the accessory battery 23 is smaller than a predetermined value, and may determine that electric generation by the electric generator 3 is not necessary otherwise. The controller 27 may determine a demanded quantity of electric energy to be generated by the electric generator 3 according to the tendency described above depending on both the consumed amount of electric energy and the stored amount of electric energy of the accessory battery 23.

First, it is assumed that the controller 27 determines that electric generation by the electric generator 3 is necessary in STEP4.

If the controller 27 determines that electric generation by the electric generator 3 is necessary in STEP4, then the controller 27 engages the electric generator clutch 13 through the electric generator clutch actuator 26, and controls a current flowing in the electric generator 3 with the regulator 24 to enable the electric generator 3 to generate electric energy according to the demanded quantity of electric energy in STEP5. At this time, either the output power (mechanical output power) of the electric energy 2 or the running energy of the hybrid vehicle is transmitted through the transfer shaft 10 and the electric generator clutch 13 to the rotatable shaft 17 of the electric generator 3, which generates electric energy with the supplied power.

While the electric generator 3 is generating electric energy, the controller 27 decides whether the hybrid vehicle is decelerating or not based on the operated status of the brake pedal, the operated status of the accelerator pedal, and the speed of the hybrid vehicle, in STEP6. If the controller 27 determines that the hybrid vehicle is decelerating, the controller 27 controls the fuel supply unit 8 and the ignition unit 9 to stop supplying fuel to and igniting fuel in the engine 1 in STEP7. Then, the controller 27 disengages the engine clutch 5 through the engine clutch actuator 7 in STEP8. Then, in order to operate the electric motor 2 as an electric generator to regenerate electric energy with the kinetic energy of the hybrid vehicle as it is decelerating, the controller 27 controls the speed reduction ratio of the transmission 4 through the transmission actuator 6 to operate the electric motor 2 in a rotational speed range for good electric generation efficiency in STEP9. The controller 27 engages the electric motor clutch 12 through the electric motor clutch actuator 25 in STEP10. Therefore, the kinetic energy of the hybrid vehicle as it is decelerating is transferred from the drive wheels through the transmission 4, the power transfer mechanism 11, the transfer shaft 10, and the electric motor clutch 12 to the rotatable shaft 15 of the electric motor 2, which now operates as an electric generator. The controller 27 then controls the regulator/inverter 21 to charge the electric motor battery 20 with an electric energy output induced by the stator coil 18 of the electric motor 2, i.e., to supply electric energy from the electric motor 2 to the electric motor battery 20, so that the electric motor 2 regenerates electric energy, in STEP11.

Since the controller 27 controls the speed reduction ratio of the transmission 4 to operate the electric motor 2 in a rotational speed range for good electric generation efficiency in STEP9, the electric motor 2 operates in the rotational speed range for good electric generation efficiency to regenerate electric energy efficiently. Because the engine clutch 5 is disengaged, the kinetic energy of the hybrid vehicle as it is decelerating is not consumed by the engine 1, but is transferred through the transfer shaft 10 to the electric motor 2. Consequently, the kinetic energy of the hybrid vehicle can efficiently be converted to electric energy to be stored in the electric motor battery 20 by the electric motor 2.

Inasmuch as the electric generator clutch 13 is engaged, the kinetic energy of the hybrid vehicle is transmitted from the drive wheels through the transmission 4, the power transfer mechanism 11, the transfer shaft 10, and the electric generator clutch 13 to the rotatable shaft 17 of the electric generator 3, which thus can generate electric energy without fail. The kinetic energy of the hybrid vehicle is not consumed by the engine 1, but is efficiently utilized by the electric generator 3 to generate electric energy.

Furthermore, since fuel supply to the engine 1 and fuel ignition in the engine 1 are stopped, the engine 1 consumes no fuel, and no electric energy is supplied from the accessory battery 23 to the ignition unit 9. Consequently, the consumption of fuel by the engine 1 while the hybrid vehicle is running is reduced, and the consumption of electric energy from the accessory battery 23 is also suppressed.

When the electric motor 2 is regenerating electric energy and the electric generator 3 is generating electric energy while the hybrid vehicle is decelerating, the controller 27 monitors whether the accelerator pedal of the hybrid vehicle is pressed or not in STEP12. If the accelerator pedal is not pressed, then the controller 27 decides whether the speed of the vehicle has dropped below a predetermined vehicle speed V0 (e.g., 15 km/h) or not in STEP13. If the accelerator pedal is not pressed and the vehicle speed is higher than the predetermined vehicle speed V0, then the controller 27 repeats the processing from STEP1.

If the accelerator pedal is pressed, indicating a demand for the output power from the engine 1, while the hybrid vehicle is decelerating, or if the vehicle speed has dropped below the predetermined vehicle speed V0, so that the kinetic energy of the hybrid vehicle becomes insufficient for the electric generator 3 to generate electric energy, then the controller 27 engages the engine clutch 5 through the engine clutch actuator 7 in STEP14. The crankshaft 1a of the engine 1 is now rotated by the kinetic energy of the hybrid vehicle. The controller 27 then controls the fuel supply unit 8 and the ignition unit 9 to resume the supply of fuel to the engine 1 and the ignition of fuel in the engine 1, thus starting the engine 1 in STEP15. Thereafter, the controller 27 performs the normal engine operation in STEP16 and then repeats the processing from STEP1.

As described above, when the vehicle speed has fallen below the predetermined vehicle speed V0 due to the deceleration of the hybrid vehicle, the engine clutch 5 is engaged to start the engine 1. Consequently, in the case where the kinetic energy of the hybrid vehicle is too small to enable the electric energy 3 to generate electric energy, since the output power from the engine 1 is transferred to the electric generator 3, which is thus allowed to generate electric energy continuously without fail.

Figure 4:
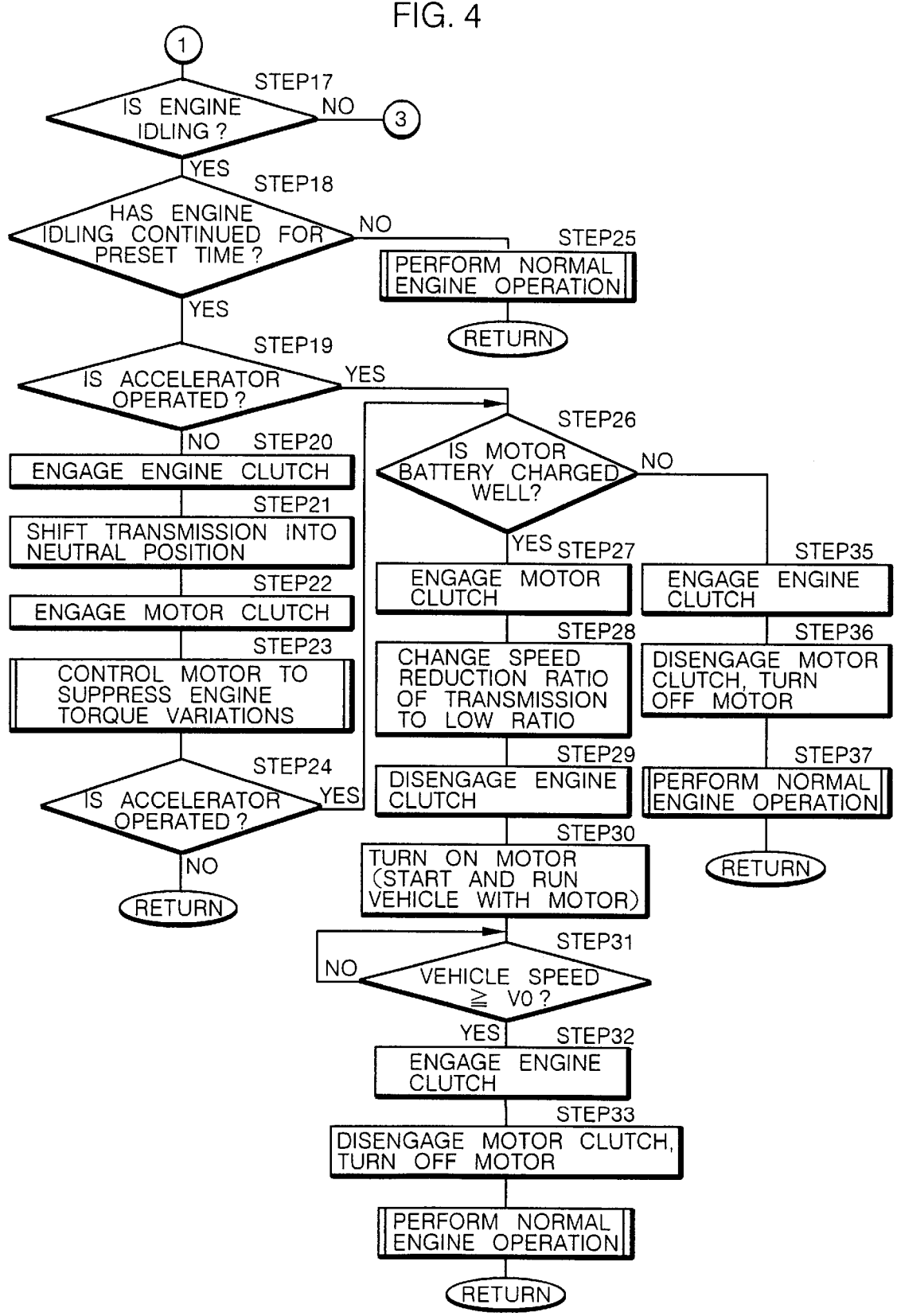
Figure 5:
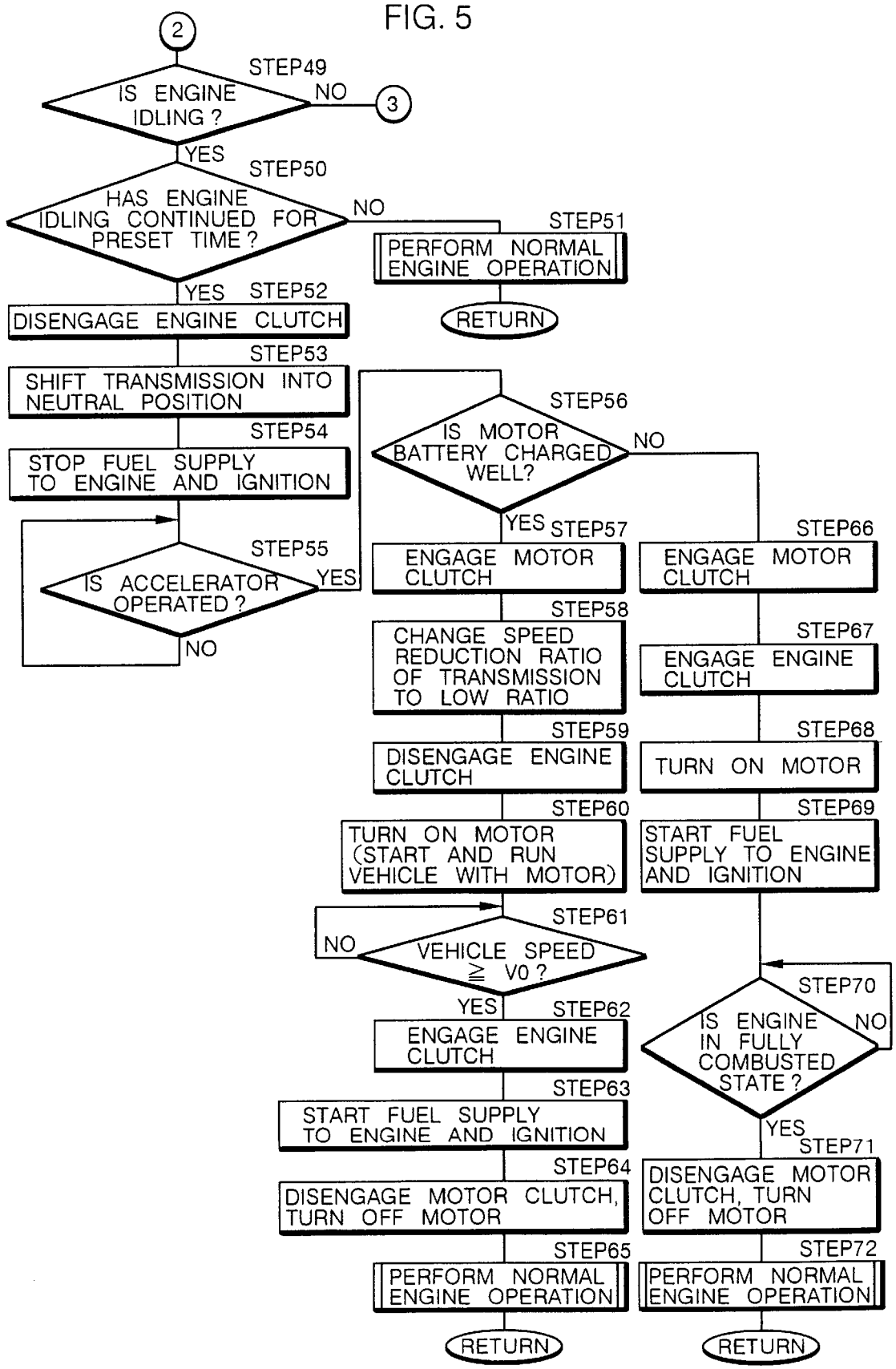

If the hybrid vehicle is not decelerating in STEP6, then the controller 27 executes the processing shown in FIG. 4 as follow:

The controller 27 decides whether the engine 1 is idling or not based on the operating status of the engine 1 and the vehicle speed in STEP17. If the engine 1 is idling, then the controller 27 decides whether the engine 1 has been idling for a predetermined time (e.g., 10 seconds) or not in STEP18. If the engine 1 has been idling for the predetermined time, i.e., if the hybrid vehicle has been continuously at rest or parked, then the controller 27 decides whether the accelerator pedal of the hybrid vehicle is pressed or not in STEP19. If the accelerator pedal of the hybrid vehicle is not pressed, the controller 27 engages the engine clutch 5 through the engine clutch actuator 7 in STEP20. The controller 27 then shifts the transmission 4 into a neutral position through the transmission actuator 6 in STEP21, and engages the electric motor clutch 12 through the electric motor clutch actuator 25 in STEP22. The controller 27 controls the electric motor 2 through the regulator/inverter 21 to suppress periodic torque variations on the crankshaft 1a in STEP23. Specifically, if the torque of the engine 1 increases, the controller 27 controls the electric motor 2 to regenerate electric energy thereby to impart a rotational force to reduce the torque to the crankshaft 1a. If the torque of the engine 1 decreases, the controller 27 controls the electric motor 2 to generate an assistive power thereby to impart a rotational force to increase the torque to the crankshaft 1a. In this manner, torque variations of the engine 1 are reduced, thereby reducing the consumption of fuel by the engine 1 when it is idling.

While thus suppressing torque variations of the engine 1, the controller 27 monitors whether the accelerator pedal is pressed or not in STEP24. If the accelerator pedal is not pressed, then the controller 27 repeats the processing from STEP1.

If the engine 1 has not been idling for the predetermined time, i.e., if the hybrid vehicle has been temporarily stopped, then the controller 27 performs the normal engine operation in STEP25 and then repeats the processing from STEP1. While the engine 1 is idling when the hybrid vehicle has been continuously at rest or parked, then since the engine clutch 5 is engaged in STEP20, the output power from the engine 1 is transferred to the electric generator 3, which generates electric energy without fail.

If the accelerator pedal is pressed in STEP19 or 24 while the engine 1 is idling, then the controller 27 decides whether the electric motor battery 20 is well charged or not in STEP26. The controller 27 makes such a decision by deciding whether the remaining capacity of the electric motor battery 20 is greater than a predetermined quantity or not. If the remaining capacity of the electric motor battery 20 is greater than the predetermined quantity, indicating that the electric motor battery 20 is well charged, then the controller 27 engages the electric motor clutch 12 through the electric motor clutch actuator 25 in order to start the hybrid vehicle with an assistive power (mechanical output power) from the electric motor 2 in STEP27. The controller 27 shifts the transmission 4 into a low ratio (smallest speed reduction ratio) through the transmission actuator 6 in STEP28. Furthermore, the controller 27 disengages the engine clutch 5 through the engine clutch actuator 7 in STEP29. The controller 27 controls the regulator/inverter 21 to supply electric energy from the electric motor battery 20 to the electric motor 2, which generates an output power to start the hybrid vehicle in STEP30.

The output power generated by the electric motor 2 at this time is transferred through the electric motor clutch 12, the transfer shaft 10, the power transfer mechanism 11, and the transmission 4 to the drive wheels of the hybrid vehicle, which is then started. Part of the output power generated by the electric motor 2 is also transferred through the transfer shaft 10 and the electric generator clutch 13 to the electric generator 3, which generates electric energy without fail.

Since the engine clutch 5 is disengaged, part of the output power generated by the electric motor 2 is not consumed by the engine 1. As the engine 1 is idling, the consumption of fuel by the engine 1 is minimized. In addition, because the remaining capacity of the electric motor battery 20 is sufficiently large, the electric motor 2 can generate a sufficiently large output power to start the hybrid vehicle smoothly.

After the hybrid vehicle has been started by the output power from the electric motor 2, the controller 27 monitors whether or not the vehicle speed has reached or exceeded the predetermined vehicle speed V0 in STEP31. If the vehicle speed is lower than the predetermined vehicle speed V0, then the controller 27 allows the hybrid vehicle to run continuously with the output power generated by the electric motor 2. If the vehicle speed has reached or exceeded the predetermined vehicle speed V0, the controller 27 engages the engine clutch 5 through the engine clutch actuator 7 in order to propel the hybrid vehicle with the output power from the engine 1 in STEP32. The controller 27 then disengages the electric motor clutch 12 through the electric motor clutch actuator 25, and controls the regulator/inverter 21 to stop supply electric energy to the electric motor 2, which stops operating in STEP33. The controller 27 performs the normal engine operation in STEP34 and then repeats the processing from STEP1.

If the remaining capacity of the electric motor battery 20 is smaller than the predetermined quantity, indicating that the electric motor battery 20 is not well charged in STEP26, then the controller 27 engages the engine clutch 5 through the engine clutch actuator 7 in order to propel the hybrid vehicle with the output power from the engine 1 in STEP35. The controller 27 then disengages the electric motor clutch 12 through the electric motor clutch actuator 25, and controls the regulator/inverter 21 to stop supplying electric energy to the electric motor 2, which stops operating in STEP36. The controller 27 performs the normal engine operation in STEP37 and then repeats the processing from STEP1.

Since the output power from the engine 1 is transferred through the electric generator clutch 13 to the electric generator 3, the electric generator 3 generates electric energy without fail.

As described above, if the electric motor battery 20 is well charged, then the hybrid vehicle is started with the output power from the electric motor 2 while the engine 1 is idling. In this manner, the consumption of fuel by the engine 1 is reduced, and the hybrid vehicle is started smoothly. If the electric motor battery 20 is not well charged, then the hybrid vehicle is started with the output power from the engine 1. Even after the hybrid vehicle is started with the output power from the electric motor 2, the hybrid vehicle is propelled by the output power from the engine 1 when the vehicle speed has increased to a certain level. Therefore, the electric motor battery 20 is prevented from consuming excessive electric energy and hence from being deteriorated too soon. When the hybrid vehicle is to be started with the output power from the engine 1, the electric motor clutch 12 is disengaged. When the hybrid vehicle is propelled by switching to the output power from the engine 1 after it has been started with the output power from the electric motor 2, the electric motor clutch 12 is also disengaged. Therefore, the load on the engine 1 is reduced, thus suppressing the consumption of fuel by the engine 1.

If the engine 1 is not idling in STEP17, then the controller 27 operates as described later on with reference to FIG. 6. If the controller 27 determines that electric generation by the electric generator 3 is not necessary in STEP4 shown in FIG. 3, then the controller 27 operates as follows:

As shown in FIG. 3, if the controller 27 determines that electric generation by the electric generator 3 is not necessary in STEP4, then the controller 27 disengages the electric generator clutch 13 through the electric generator clutch actuator 26, and controls the regulator/inverter 21 to stop supplying a current to the electric generator 3, which is thus de-energized in STEP38. The output power of the engine 1 is no longer transferred to the rotatable shaft 17 of the electric generator 3, and the load on the engine 1 is lowered, thus reducing the consumption of fuel by the engine 1.

After disengaging the electric generator clutch 13, the controller 27 decides whether the hybrid vehicle is decelerating or not in STEP39.

If the hybrid vehicle is decelerating, then the controller 27 executes the same processing as the processing in STEPs 7–11 in STEPs 40–44. Specifically, the controller 27 stops supplying fuel to the engine 1 and igniting fuel in the engine 1, and disengages the engine clutch 5. The controller 27 controls the speed reduction ratio of the transmission 4 to a speed reduction ratio for efficient regeneration of electric energy, and thereafter engages the electric motor clutch 12 to cause the electric motor 2 to regenerate electric energy with the kinetic energy of the hybrid vehicle as it is decelerating.

Since the supply of fuel to the engine 1 and the ignition of fuel in the engine 1 are stopped, the engine 1 consumes no fuel and the consumption of electric energy from the accessory battery 23 is reduced.

Because the controller 27 controls the speed reduction ratio of the transmission 4 to operate the electric motor 2 in a rotational speed range for good electric generation efficiency, the electric motor 2 operates to regenerate electric energy efficiently. Since the engine clutch 5 is disengaged and the electric generator clutch 13 is also disengaged, the kinetic energy of the hybrid vehicle as it is decelerating is not consumed by the engine 1 and the electric generator 3, but can efficiently be converted to electric energy to be stored in the electric motor battery 20 by the electric motor 2.

When the electric motor 2 is regenerating electric energy while the hybrid vehicle is decelerating, the controller 27 monitors whether the accelerator pedal of the hybrid vehicle is pressed or not in STEP45. If the accelerator pedal is not pressed, then the controller 27 repeats the processing from STEP1. If the accelerator pedal is pressed, then the controller 27 engages the engine clutch 5 through the engine clutch actuator 7 in STEP46, as when the electric generator 3 generates electric energy. The crankshaft 1a of the engine 1 is now rotated by the kinetic energy of the hybrid vehicle. The controller 27 then controls the fuel supply unit 8 and the ignition unit 9 to resume the supply of fuel to the engine 1 and the ignition of fuel in the engine 1, thus starting the engine 1 in STEP47. Thereafter, the controller 27 performs the normal engine operation in STEP48 and then repeats the processing from STEP1.

In this case, since the electric generator 3 is not required to generate electric energy, the engine 1 does not resume its operation even when the vehicle speed falls below the predetermined vehicle speed V0 while the hybrid is vehicle is decelerating.

If the hybrid vehicle is not decelerating in STEP39, then the controller 27 decides whether the engine 1 is idling or not in STEP49.

If the engine 1 is idling, then the controller 27 decides whether the engine 1 has been idling for a predetermined time or not, i.e., if the hybrid vehicle has been continuously at rest or parked, in STEP50. If the engine 1 has not been idling for the predetermined time, i.e., if the hybrid vehicle has been temporarily stopped, then the controller 27 performs the normal engine operation in STEP51 and then repeats the processing from STEP1.

If the engine 1 is not idling in STEP49, then the controller 27 operates as described later on with reference to FIG. 6.

If the engine 1 has been idling for the predetermined time, i.e., if the hybrid vehicle has been continuously at rest or parked, in STEP50, then the controller 27 disengages the engine clutch 5 through the engine clutch actuator 7 in STEP52. The controller 27 then shifts the transmission 4 into the neutral position through the transmission actuator 6 in STEP53, and controls the fuel supply unit 8 and the ignition unit 9 to stop supplying fuel to and igniting fuel in the engine 1 in STEP54. The engine 1 no longer consumes fuel, so that the consumption of fuel by the engine 1 is reduced, and the consumption of electric energy from the accessory battery 23 is reduced. At this time, the engine 1 may be stopped in operation as the electric generator 3 is not required to generate electric energy.

After stop the supply of fuel to and the ignition of fuel in the engine 1, the controller 27 monitors whether the accelerator pedal of the hybrid vehicle is pressed or not in STEP55. If the accelerator pedal is not pressed, then the controller 27 continues the present status (the stopped operation of the engine 1). If the accelerator pedal is pressed, then the controller 27 decides whether the electric motor battery 20 is well charged or not, i.e., whether the remaining capacity of the electric motor battery 20 is greater than the predetermined quantity or not, in STEP56. If the electric motor battery 20 is well charged, then the controller 27 executes the same processing as the processing in STEPs 27–30 in STEPs 57–60, starting the hybrid vehicle with the output power (mechanical output power) from the electric motor 2. Since the electric motor battery 20 is well charged, the electric motor 2 can generate an amount of electric energy required to start the hybrid vehicle, which is thus started smoothly. Inasmuch as the engine 1 remains stopped in operation, the hybrid vehicle can be started without causing the engine 1 to consume fuel. Since the engine clutch 5 is disengaged, the output power from the electric motor 2 is not transferred to the crankshaft 1a of the engine 1. Consequently, the load on the electric motor 2 is reduced, minimizing the consumption of electric energy by the electric motor 2.

After the hybrid vehicle has been started by the output power from the electric motor 2, the controller 27 monitors whether or not the vehicle speed has reached or exceeded the predetermined vehicle speed V0 in STEP61. If the vehicle speed is lower than the predetermined vehicle speed V0, then the controller 27 allows the hybrid vehicle to run continuously with the output power generated by the electric motor 2. If the vehicle speed has reached or exceeded the predetermined vehicle speed V0, the controller 27 engages the engine clutch 5 through the engine clutch actuator 7 in STEP62. The crankshaft 1a is now rotated by the output power from the electric motor 2. The controller 27 then controls the fuel supply unit 8 and the ignition unit 9 to resume the supply of fuel to the engine 1 and the ignition of fuel in the engine 1, thus starting the engine 1 in STEP63. Thereafter, the controller 27 disengages the electric motor clutch 12 through the electric motor clutch actuator 25, and controls the regulator/inverter 21 to stop supplying electric energy to the electric motor 2, which stops operating in STEP64. The controller 27 performs the normal engine operation in STEP65 and then repeats the processing from STEP1.

Therefore, as in the case where the electric generator 3 generates electric energy, when the hybrid vehicle is started by the output power of the electric motor 2, if the vehicle speed has reached or exceeded the predetermined vehicle speed V0, then the hybrid vehicle is propelled by switching to the output power from the engine 1.

If the remaining capacity of the electric motor battery 20 is smaller than the predetermined quantity, indicating that the electric motor battery 20 is not well charged in STEP56, then in order to start the engine 1 with the output power from the electric motor 2, the controller 27 engages the electric motor clutch 12 through the electric motor clutch actuator 25 in STEP66. The controller 27 then engages the engine clutch 5 through the engine clutch actuator 7 in STEP67. The output power from the electric motor 2 can now be transferred to the crankshaft 1a.

The controls the regulator/inverter 21 to supply electric energy from the electric motor battery 20 to the electric motor 2, which operates as a starter for the engine 1 in STEP68. The crankshaft 1a is now rotated by the output power from the electric motor 2. The controller 27 then controls the fuel supply unit 8 and the ignition unit 9 to resume the supply of fuel to the engine 1 and the ignition of fuel in the engine 1 in STEP69. Thereafter, the controller 27 monitors whether the engine 1 is in a fully combusted state, i.e., whether the engine 1 has started operating normally, in STEP70.

If the engine 1 has started operating normally, then the controller 27 disengages the electric motor clutch 12, and stops supplying electric energy from the electric motor battery 20 to the electric motor 2, which stops operating in STEP71. The controller 27 performs the normal engine operation to start the hybrid vehicle with the output power from the engine 1 in STEP72 and then repeats the processing from STEP1.

As described above, if the electric motor battery 20 is well charged when the hybrid vehicle is to be started while the electric generator 3 is not required to generate electric energy, the supply of fuel to and the ignition of fuel in the engine 1 are stopped, and the hybrid vehicle is started with the output power from the electric motor 3 while stopping the operation of the engine 1. Thus, the hybrid vehicle can be started smoothly and at the same time the consumption of fuel by the engine 1 is reduced. If the electric motor battery 20 is not well charged, then the hybrid vehicle is started with the output power from the engine 1. Even after the hybrid vehicle is started with the output power from the electric motor 2, the hybrid vehicle is propelled by the output power from the engine 1 when the vehicle speed has increased to a certain level. Therefore, the electric motor battery 20 is prevented from consuming excessive electric energy and hence from being deteriorated too soon. When the hybrid vehicle is to be started with the output power from the engine 1, the electric motor 2 is energized in order to start operating the engine 1, but the electric motor 2 is energized only when the engine 1 starts operating. Therefore, the electric motor battery 20 does not consume a substantial amount of electric energy, and the supply of electric energy to the electric motor 3 to start operating the engine 1 does not pose a large load on the electric motor battery 20.

For starting the hybrid vehicle with the output power from the engine 1, the electric motor clutch 12 is disengaged. When the hybrid vehicle runs by switching to the output power from the engine 1 after the hybrid vehicle is started with the output power from the engine 1, the electric motor clutch 12 is also disengaged. In this case, since the electric generator clutch 13 is also disengaged, the load on the engine 1 is reduced, thereby reducing the consumption of fuel by the engine 1.

Figure 6:
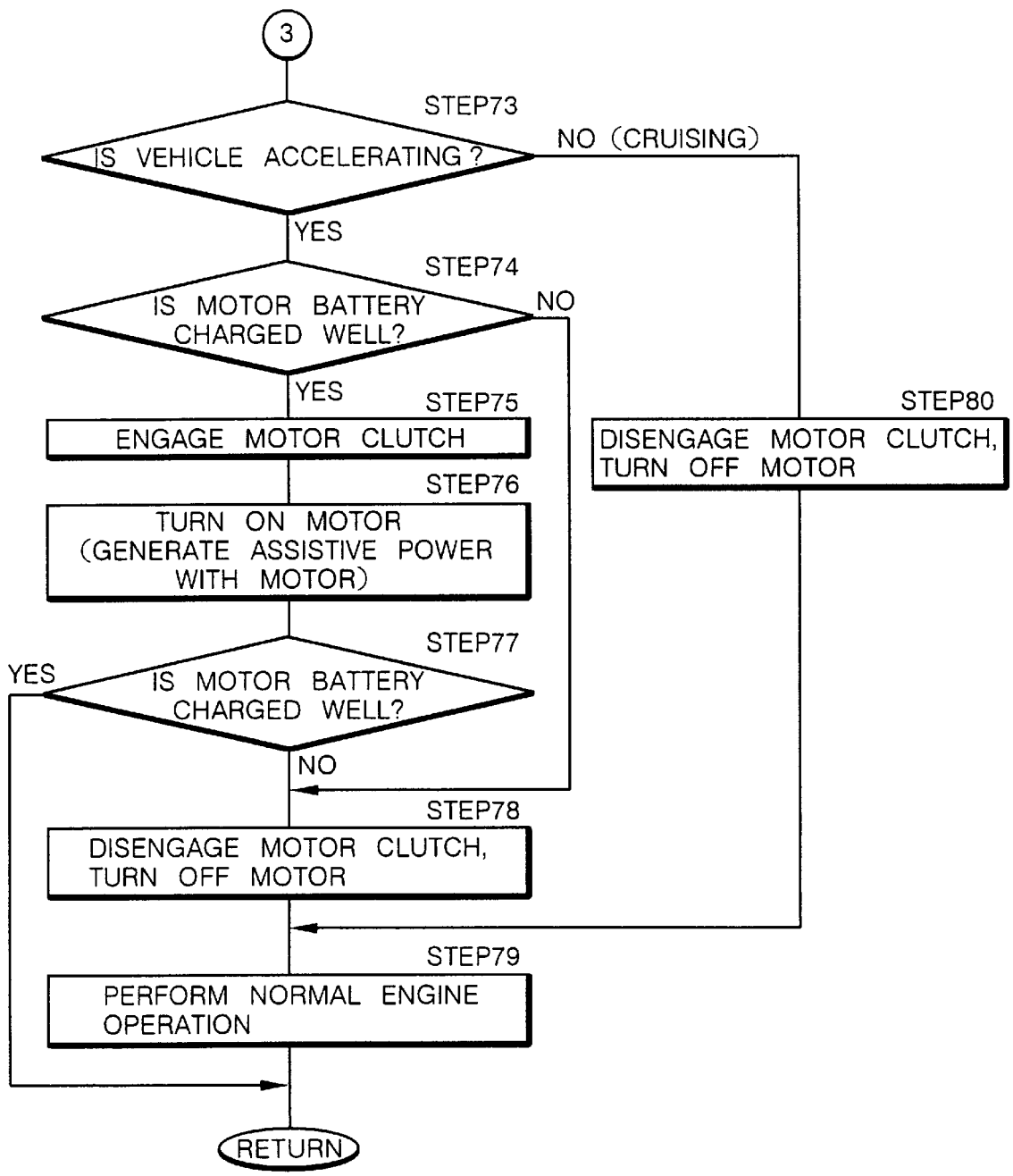

If the engine 1 is not idling in STEP17 (see FIG. 4) or STEP49 (see FIG. 5), then the controller 27 the processing shown in FIG. 6.

The controller 27 operates in the same manner regardless of whether the engine 1 is not idling in STEP17 or STEP49. The controller 27 first decides whether the hybrid vehicle is accelerating or not depending on the operated status of the accelerator pedal in STEP73. If the hybrid vehicle is accelerating, then the controller 27 decides whether the electric motor battery 20 is well charged or not, i.e., whether the remaining capacity of the electric motor battery 20 is greater than a predetermined quantity or not, in STEP74. Specifically, if the voltage a across the electric motor battery 20 is 180 V when it is fully charged, the controller 27 decides whether or not the remaining capacity of the electric motor battery 20 is 80% or more (this threshold value may be set to 50% or the like depending on the pattern in which the electric motor 2 is used, e.g., whether the electric motor 2 is frequently used or not), or the capacity of the electric motor battery 20.

If the electric motor battery 20 is well charged, then the controller 27 engages the electric motor clutch 12 through the electric motor clutch actuator 25 in STEP27. The controller 27 controls the regulator/inverter 21 to supply electric energy from the electric motor battery 20 to the electric motor 2, which then generates an assistive output power to assist the output power of the engine 1 in STEP7 6. At this time, the engine clutch 5 is engaged to transmit the output power of the engine 1 through the transmission 4 to the drive wheels of the hybrid vehicle. The assistive output power generated by the electric motor 2 is added to the output power from the engine 1 through the transfer shaft 10 and the power transfer mechanism 11. The sum of the assistive output power and the output power from the engine 1 is then transferred through the transmission 4 to the drive wheels. In this manner, the hybrid vehicle achieves a desired level of accelerating performance while suppressing the output power of the engine 1.

While the assistive output power is being generated by the electric motor 2, the controller 27 monitors whether the electric motor battery 20 is well charged or not, i.e., whether the remaining capacity of the electric motor battery 20 is greater than a predetermined quantity or not, in STEP77. If the electric motor battery 20 is well charged, then the controller 27 repeats the processing from STEP1.

If the remaining capacity of the electric motor battery 20 is smaller than the predetermined quantity and the electric motor battery 20 is not well charged in STEP74 or STEP77, then the controller 27 disengages the electric motor clutch 12, and stops supplying electric energy from the electric motor battery 20 to the electric motor 2, which stops operating in STEP78. The controller 27 performs the normal engine operation in STEP79, and then repeats the processing from STEP1 while maintaining the desired level of accelerating performance for the hybrid vehicle.

As described above, if the electric motor battery 20 is well charged when the hybrid vehicle is accelerating, then the output power of the engine 1 and also the output power of the electric motor 2 are transferred to the drive wheels to achieve a desired level of accelerating performance for the hybrid vehicle while suppressing the consumption of fuel by the engine 1. If the electric motor battery 20 is not well charged when the hybrid vehicle is accelerating, then the supply of electric energy from the electric motor battery 20 to the electric motor 2 is stopped to de-energize the electric motor 2. Consequently, the electric motor battery 20 is prevented from consuming excessive electric energy and hence from being deteriorated too soon. At this time, since the electric motor clutch 12 is disengaged, the output power of the engine 1 is not transferred to the electric motor 2, and hence the load on the engine 1 is reduced. Thus, the hybrid vehicle can be accelerated as desired while the consumption of fuel by the engine 1 is being suppressed.

If the electric generator 3 is required to generate electric energy when the hybrid vehicle is accelerating, because the electric generator clutch 13 is engaged, the output power of the engine 1 and the assistive output power of the electric motor 2 are transferred to the electric generator 3, which can generate electric energy without fail. If the electric generator 3 is not required to generate electric energy, then the electric generator clutch 13 is disengaged, so that the loads on the engine 1 and the electric motor 2 are reduced and hence the consumption of energy thereby is also reduced.

If the hybrid vehicle is not accelerating in STEP73, since the hybrid vehicle is not decelerating and the engine 1 is not idling, the hybrid vehicle is cruising, i.e., running at a constant speed. When the hybrid vehicle is cruising, the controller 27 disengages the electric motor clutch 12, and stops supplying electric energy from the electric motor battery 20 to the electric motor 2, which stops operating in STEP80. The controller 27 performs the normal engine operation in STEP79, and then repeats the processing from STEP1 while allowing the hybrid vehicle to cruise with the output power of the engine 1.

As described above, since the electric motor clutch 12 is disengaged while the hybrid vehicle is cruising, the load on the engine 1 is reduced, thus minimizing the consumption of fuel by the engine 1. In addition, because the electric motor 2 is de-energized at this time, the consumption of electric energy from the electric motor battery 20 is reduced.

If the electric generator 3 is required to generate electric energy when the hybrid vehicle is cruising, since the electric generator clutch 13 is engaged, the output power of the engine 1 is transferred to the electric generator 3, which generates electric energy without fail. If the electric generator 3 is not required to generate electric energy, then the electric generator clutch 13 is disengaged, so that the load on the engine 1 is reduced and hence the consumption of fuel thereby is also reduced.

As described above, on the hybrid vehicle according to the present invention, the engine clutch 5, the electric motor clutch 12, and the electric generator clutch 13 are controlled for engagement and disengagement depending on the running status of the hybrid vehicle, the charged status of the electric motor battery 20, and the consumption of electric energy from the accessory battery 23. As these clutches are engaged and disengaged, the engine 1, the electric motor 2, and the electric generator 3 are controlled in their operation. In this manner, the hybrid vehicle can be operated appropriately for reducing the consumption of fuel by the engine 1 and also reducing the consumption of excessive electric energy from the electric motor battery 20 thereby to prevent the electric motor battery 20 from being deteriorated too soon.

When the hybrid vehicle to which the principles of the present invention are applied is to be started, the controller 27 selects the starting of the hybrid vehicle with the output power of the electric motor 2 or the starting of the hybrid vehicle with the output power of the engine 1. If the remaining capacity of the electric motor battery 20 is sufficiently large and the electric motor battery 20 is capable of generating an output power that can start the hybrid vehicle, then the engine 1 is controlled to be idling or stopped, and the hybrid vehicle is started with the output power of the electric motor 2. Therefore, the consumption of fuel by the engine 1 is reduced, and at the same time the hybrid vehicle is started smoothly. Since the engine clutch 5 is disengaged at this time, the load on the electric motor 2 is reduced, minimizing the consumption of electric energy from the electric motor battery 20 by the electric motor 2.

After the hybrid vehicle has been started with the output power of the electric motor 2, when the vehicle speed increases to a certain level, the hybrid vehicle is propelled by switching to the output power of the engine 1. If the remaining capacity of the electric motor battery 20 is too low to start the hybrid vehicle, then the hybrid vehicle is started with the output power of the engine 1. Therefore, the electric motor battery 20 is prevented from consuming excessive electric energy and hence from being deteriorated too soon.

For switching to the output power of the engine after the hybrid vehicle has been started with the output power of the electric motor 2, or for starting the hybrid vehicle with the output power of the engine 1, the electric motor clutch 12 is disengaged. Accordingly, the load on the engine 1 is reduced, and hence the consumption of fuel by the engine 1 is suppressed.

Although a certain preferred embodiment of the present invention has been shown and described in detail, it should be understood that various changes and modifications may be made therein without departing from the scope of the appended claims.

What is claimed is:

1. A hybrid vehicle comprising:
   an engine for propelling the hybrid vehicle, said engine having an output shaft;
   power transfer means for transferring an output power of said engine from the output shaft thereof to drive wheels of the hybrid vehicle;
   an electric motor for supplying an assistive output power to assist the output power of said engine through said power transfer means to said drive wheels;
   electric energy storage means for storing electric energy for energizing said electric motor; and
   vehicle operation control means for controlling operation of the hybrid vehicle with said engine and said electric motor;
   said vehicle operation control means comprising means for controlling said electric motor to generate said assistive output power to start the hybrid vehicle with the electric energy supplied from said electric energy storage means to said electric motor while said engine is idling or stopped, if the amount of electric energy stored in said electric energy storage means is greater than a predetermined quantity, and for controlling said engine to cause said output shaft to generate an output power to start the hybrid vehicle while said electric motor is being de-energized, if the amount of electric energy stored in said electric energy storage means is smaller than said predetermined quantity.

2. A hybrid vehicle according to claim 1, further comprising engine clutch means controllable by said vehicle operation control means, for connecting said output shaft of the engine disconnectably to said power transfer means, said electric motor being connected to said power transfer means at an output side of said engine clutch means, said vehicle operation control means comprising means for disengaging said engine clutch means when the hybrid vehicle is started by the assistive output power generated by said electric motor.

3. A hybrid vehicle according to claim 1, wherein said vehicle operation control means comprises means for controlling said engine to cause said output shaft to generate an output power to start the hybrid vehicle while said electric motor is being de-energized, if the speed of the hybrid vehicle is higher than a predetermined speed after the hybrid vehicle is started by the assistive output power generated by said electric motor.

4. A hybrid vehicle according to claim 2, wherein said vehicle operation control means comprises means for disengaging said engine clutch means and controlling said engine to cause said output shaft to generate an output power to start the hybrid vehicle while said electric motor is being de-energized, if the speed of the hybrid vehicle is higher than a predetermined speed after the hybrid vehicle is started by the assistive output power generated by said electric motor.

5. A hybrid vehicle according to claim 3 or 4, further comprising motor clutch means controllable by said vehicle operation control means, for connecting said electric motor disconnectably to said power transfer means, said vehicle operation control means comprising means for engaging said motor clutch means for starting the hybrid vehicle with the assistive output power generated by said electric motor, and for disengaging said motor clutch means for propelling the hybrid vehicle with the output power of said engine after the hybrid vehicle is started.

6. A hybrid vehicle according to claim 5, wherein said vehicle operation control means comprises means for disengaging said motor clutch means after the hybrid vehicle is started with the output power of said engine.

7. A hybrid vehicle according to any one of claims 1 through 4, further comprising motor clutch means controllable by said vehicle operation control means, for connecting said electric motor disconnectably to said power transfer means, said vehicle operation control means comprising means for disengaging said motor clutch means when the hybrid vehicle is started with the output power of said engine.

* * * * *